United States Patent
Wang et al.

(10) Patent No.: US 10,598,771 B2
(45) Date of Patent: Mar. 24, 2020

(54) DEPTH SENSING WITH MULTIPLE LIGHT SOURCES

(71) Applicant: ANALOG DEVICES GLOBAL UNLIMITED COMPANY, Hamilton (BM)

(72) Inventors: Chao Wang, Militas, CA (US); Eoin English, Pallasgreen (IE); Javier Calpe Maravilla, Alegemesi (ES); Maurizio Zecchini, San Jose, CA (US)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 435 days.

(21) Appl. No.: 15/409,183

(22) Filed: Jan. 18, 2017

(65) Prior Publication Data

US 2018/0203102 A1 Jul. 19, 2018

(51) Int. Cl.
| | |
|---|---|
| *G01S 7/48* | (2006.01) |
| *G01S 7/481* | (2006.01) |
| *G01S 7/484* | (2006.01) |
| *G01S 17/08* | (2006.01) |
| *G01S 17/89* | (2020.01) |
| *G01S 17/10* | (2020.01) |
| *G01S 7/4865* | (2020.01) |

(52) U.S. Cl.
CPC ............ *G01S 7/4817* (2013.01); *G01S 7/484* (2013.01); *G01S 7/4815* (2013.01); *G01S 17/08* (2013.01); *G01S 17/10* (2013.01); *G01S 17/89* (2013.01); *G01S 7/4865* (2013.01)

(58) Field of Classification Search
None
See application file for complete search history.

(56) References Cited

U.S. PATENT DOCUMENTS

| | | |
|---|---|---|
| 5,225,876 A | 7/1993 | Lux et al. |
| 9,267,787 B2 | 2/2016 | Shpunt et al. |
| 10,305,247 B2 * | 5/2019 | Bills ..................... G01S 7/4817 |
| 2010/0008588 A1 * | 1/2010 | Feldkhun ........... G01B 11/2518 382/206 |
| 2010/0265557 A1 | 10/2010 | Sallander |
| 2011/0043806 A1 * | 2/2011 | Guetta .................. G01S 17/026 356/432 |
| 2012/0203502 A1 * | 8/2012 | Hayes .................. G01C 15/002 702/155 |

(Continued)

OTHER PUBLICATIONS

International Search Report and Written Opinion issued in International Patent Application Serial No. PCT/US2018/014290 dated May 15, 2018, 12 pages.

(Continued)

*Primary Examiner* — Hovhannes Baghdasaryan
(74) *Attorney, Agent, or Firm* — Patent Capital Group

(57) ABSTRACT

Aspects of the embodiments are directed to a time-of-flight imaging system and methods of using the same. The time-of-flight imaging system includes a light emitter comprising at least one one-dimensional array of laser diodes; a photosensitive element for receiving reflected light from an object; and a light deflection device configured to deflect light from the light emitter to the object. In embodiments, the time-of-flight imaging system includes a lens structure to deflect emitting light from the laser diodes at a predetermined angle towards a light steering device.

21 Claims, 12 Drawing Sheets

(56) References Cited

U.S. PATENT DOCUMENTS

2014/0313519 A1   10/2014  Shpunt et al.
2015/0260830 A1*  9/2015  Ghosh ..................... G01S 7/484
                                                                   250/208.1
2016/0182895 A1    6/2016  Ko et al.
2016/0274223 A1    9/2016  Imai

OTHER PUBLICATIONS

Ming-Jie Sun et al., *Single-Pixel 3D Imaging with Time-Based Depth Resolution*, arXiv:1603.00726v1 [physics.optics] Mar. 2, 2016, 10 pages.

* cited by examiner

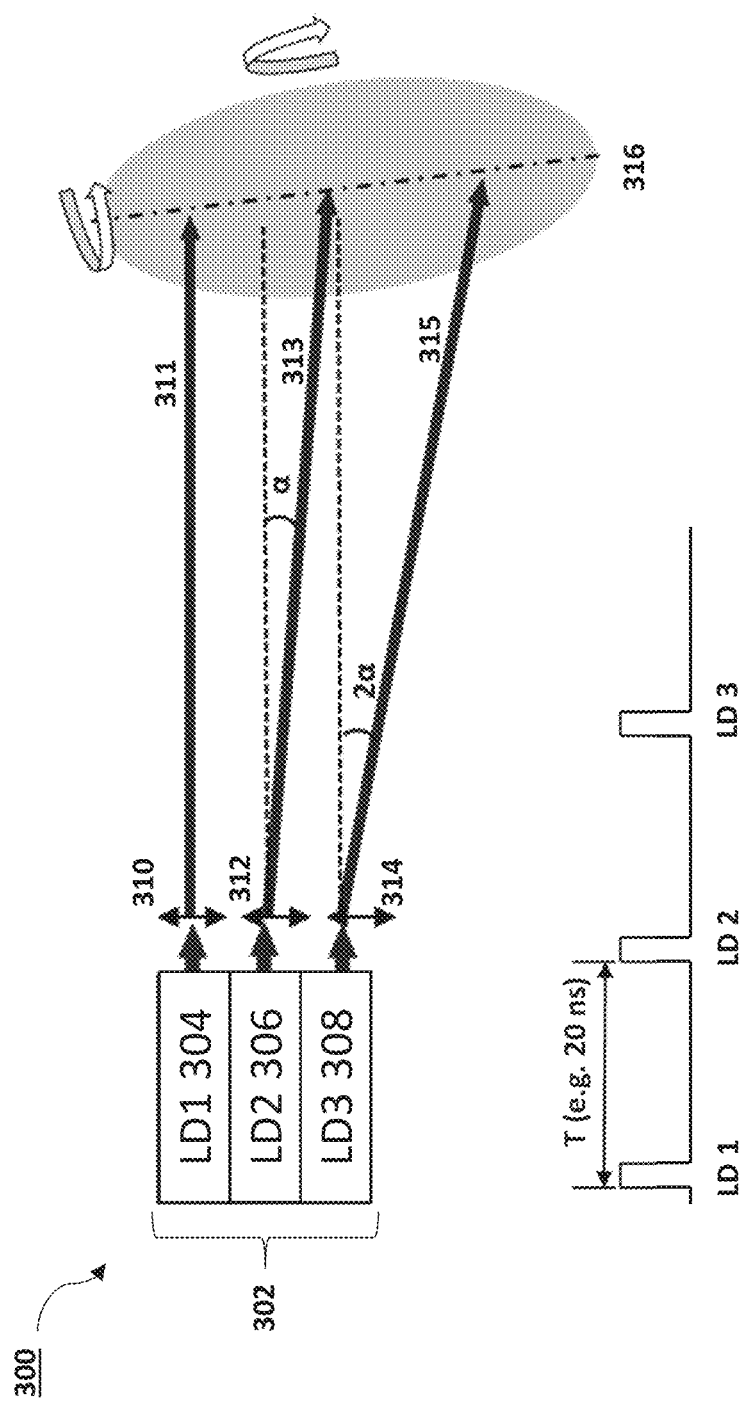

DEPTH SENSING WITH MULTIPLE LIGHT SOURCES

FIELD

This disclosure pertains to systems and methods for estimating depth of an object using multiple light sources.

BACKGROUND

Depth sensing imaging systems can use coherent light sources and a light steering device to illuminate a scene to acquire depth estimations. The acquisition time for a large number of points can be limited by electromechanical steering devices to address higher spatial resolutions and fast frame rates.

SUMMARY

Aspects of the embodiments are directed to a time-of-flight imaging system. The time-of-flight imaging system can include a light emitter comprising at least one one-dimensional array of laser diodes; a photosensitive element for receiving reflected light from an object; and a light deflection device configured to deflect light from the light emitter to the object.

Aspects of the embodiments are directed to a method for operating a time-of-flight imaging system. The method can include driving each laser diode of an array of laser diodes to emit a pulse of light; steering light emitted from each laser diode; and adjusting a deflection of a light steering device after each laser diode has emitted the pulse of light.

BRIEF DESCRIPTION OF THE DRAWINGS

FIG. 3A is a schematic diagram of a laser diode stack and a 2D scanning mirror in accordance with embodiments of the present disclosure.

DETAILED DESCRIPTION

This disclosure describes using multiple coherent light sources as a light emission source for a time-of-flight depth sensing imaging system. The use of multiple coherent light sources as the light emission source allows for the simplification of the light steering device can increase in acquisition rates, and/or an increase in spatial resolution.

Figure 1:
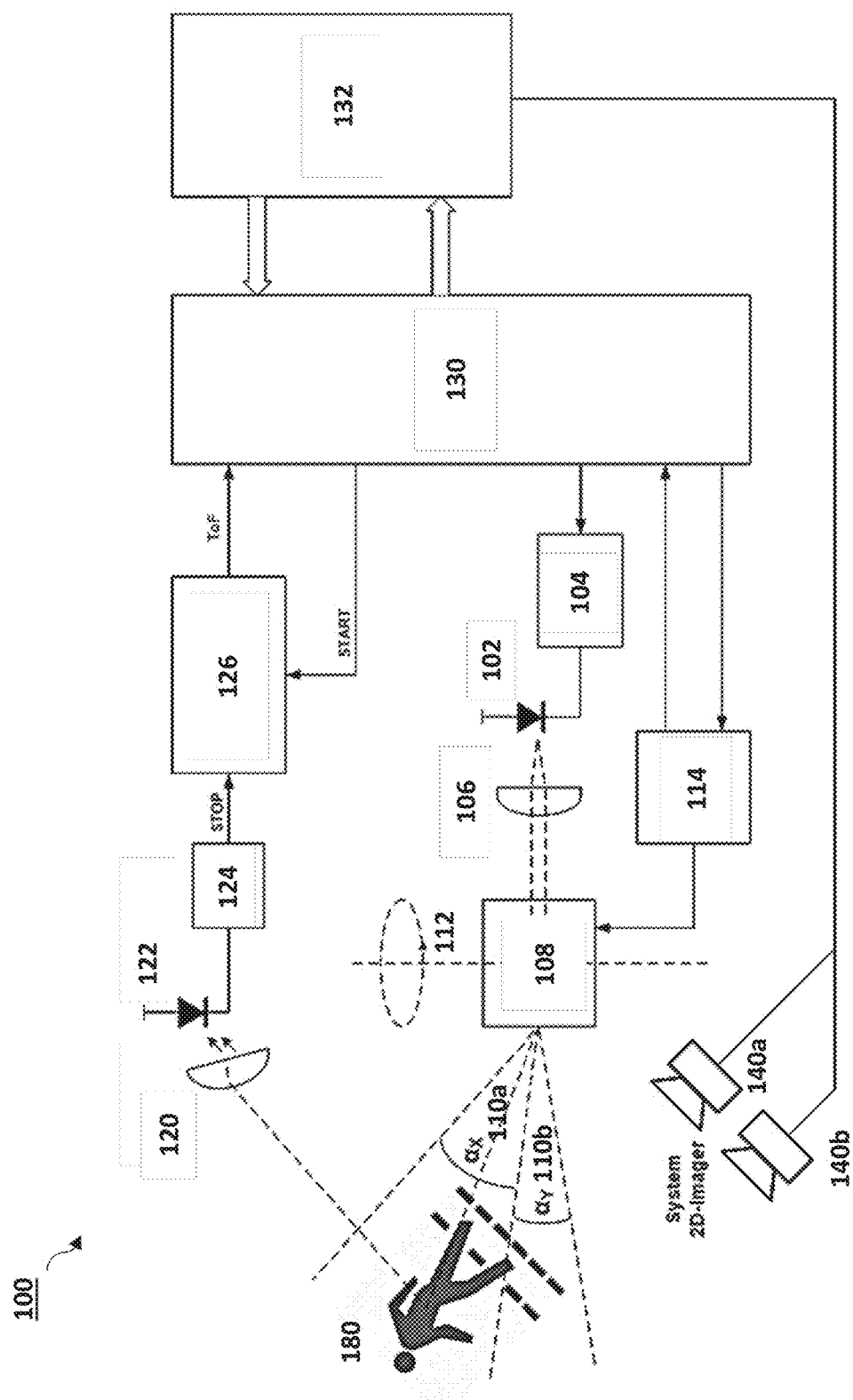
FIG. 1 is a schematic diagram of an example imaging system in accordance with embodiments of the present disclosure.

FIG. 1 is a schematic diagram of an example imaging system 100 in accordance with embodiments of the present disclosure. The imaging system 100 includes a light emitter 102. Light emitter 102 can be a light producing device that produces a coherent beam of light that can be in the infrared (IR) range. Some examples of light emitters 102 include laser diodes, solid-state lasers, vertical cavity surface-emitting laser (VCSEL), narrow angle light emitting diodes (LEDs), etc. The imaging system 100 can also include a light emitter driver 104. The light emitter driver 104 can drive the light emitter 102 with a very short (e.g., nanosecond range), high energy pulse. Some examples of light emitter drivers 104 include gallium nitride (GaN) field effect transistors (FETs), dedicated high speed integrated circuits (ICs), application specific integrated circuits (ASICs), etc. In some embodiments, the driver 104 and light emitter 102 can be a single device.

The imaging system 100 can also include a collimating lens 106. The collimating lens 106 makes sure that the angle of each emission of emitted light is as parallel as possible to one another to improve the spatial resolution and to make sure all the emitted light is transferred through the light steering device 108. The light steering device 108 allows collimated light to be steered, in a given field of view (FOV), within a certain angle αX and αY. Light steering device 108 can be a 2D light steering device, where light can be diverted horizontally (110a, αX) and vertically (110b, αY). In embodiments, light steering device 108 can be a 1D device that can steer light only in one direction (αX or αY). Typically a light steering device 108 is electrically controlled to change deflection angle. Some examples of a steering device are: MEMS mirrors, acoustic crystal modulators, liquid crystal waveguides, or other types of light steering devices. In some embodiments, the light steering device 108 can be assembled in a rotating platform (112) to cover up to 360 degrees field of view.

The imaging device 100 can include a light steering device controller and driver 114. The light steering device controller 114 can provide the necessary voltages and signals to control the steering light device deflection angle. The light steering device controller 114 may also use feedback signals to know the current deflection and apply corrections. Typically the light steering device controller 114 is a specialized IC designed for a specific steering device 108.

The imaging system can also include a collecting lens 120. The highly focused light projected in the FOV (110a and 110b) when hitting an object (108) reflects and scatters, the collecting lens 120 allows as much as possible reflected light to be directed in the active area of the photosensitive element 122. Photosensitive element 122 can be a device that transforms light received in an active area into an electrical signal that can be used for image detection. Some examples of photosensitive elements include photodetectors, photodiodes (PDs), avalanche photodiodes (APDs), single-photon avalanche photodiode (SPADs), photomultipliers (PMTS).

An analog front end 124 provides conditioning for the electrical signal generated by the photodetector before reaching the analog to digital converter (ADC)/time to digital converter (TDC) elements. Conditioning can include amplification, shaping, filtering, impedance matching and amplitude control. Depending on the photodetector used not all the described signal conditionings are required.

The imaging system 100 can include a time-of-flight (ToF) measurement unit 126. The ToF measurement unit uses a START and STOP signals to measure the time-of-flight of the pulse sent from the light emitter 102 to reach the object 180 and reflect back to the photosensitive element 122. The measurement can be performed using a Time to Digital Converter (TDC) or an Analog to Digital Converter (ADC), in the TDC case the time difference between START and STOP is measured by a fast clock. In the ADC case the received signal is sampled until a pulse is detected (generating the STOP signal) or a maximum time has elapsed. In both cases this block provides one or more ToF measurements to a 3D sensing processor 130 or application processor (132) for further data processing and visualization/ actions.

The 3D sensing processor 130 is a dedicated processor controlling the 3D sensing system operations such as: Generating timings, providing activation pulse for the light emitter, collecting ToF measurements in a buffer, performing signal processing, sending collected measurements to the application processor, performing calibrations.

The application processor 132 can be a processor available in the system (e.g. a CPU or baseband processor). The application processor 132 controls the activation/deactivation of the 3D sensing system 130 and uses the 3D data to perform specific tasks such as interacting with the User Interface, detecting objects, navigating. In some cases the application process 132 uses the 2D information from the system imager (140a) to augment the information obtained from the 3D system for additional inferences. In some embodiments, 3D sensing processor 130 and application processor 132 can be implemented by the same device.

Figure 2:
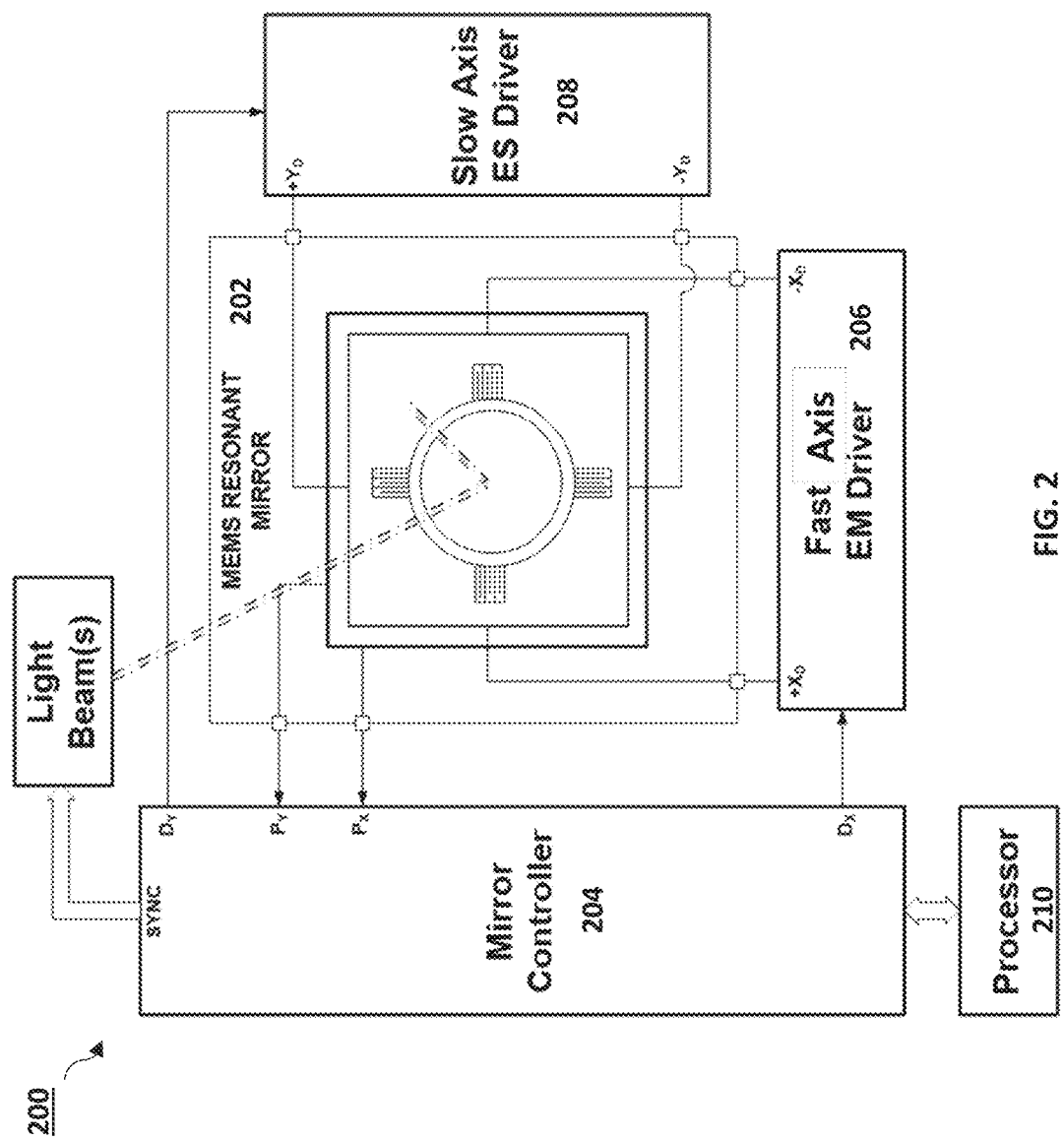
FIG. 2 is a schematic diagram of an example image steering device in accordance with embodiments of the present disclosure.

As mentioned above, light steering device 108 can include a MEMS mirror, an acoustic crystal modulator, a liquid crystal waveguides, etc. FIG. 2 illustrates an example MEMS mirror 200. MEMS mirror 200 can be a miniaturized electromechanical device using micro-motors to control the deflection angle of a micro mirror 202 supported by torsion bars. 1D MEMS Mirrors can deflect light along one direction while 2D MEMS mirrors can deflect light along two orthogonal axes. Typical use of 1D MEMS Mirror is a barcode scanner while a 2D MEMS Mirror can be used in pico-projectors, Head-Up-Displays and 3D sensing.

When operating at video frame rates a 2D MEMS Mirror is designed to operate the fast axis (e.g. Horizontal pixel scan) in resonant mode while the slow axis (e.g. Vertical Line Scan) operates in non-resonant (linear) mode. In resonant mode the MEMS oscillates at its natural frequency, determined by its mass, spring factor and structure, the mirror movement is sinusoidal and cannot be set to be at one specific position. In non-resonant mode the MEMS Mirror position is proportional to the current applied to the micromotor, in this mode of operation the mirror can be set to stay at a certain position.

The MEMS micro-motor drive can be electrostatic or electromagnetic. Electrostatic drive is characterized by high driving voltage, low driving current and limited deflection angle. Electromagnetic drive is characterized by low driving voltage, high driving current and wider deflection angle. The fast axis is typically driven by a fast axis electromagnetic actuator 206 (because speed and wider FOV are paramount) while the slow axis is driven by a slow axis electrostatic actuator 208 to minimize power consumption. Depending on the MEMS design and application the driving method can change.

In order to synchronize the activation of the light source according to the current mirror position it is necessary for the MEMS mirror to have position sensing so that the mirror controller 204 can adjust the timings and know the exact time to address a pixel or a line. A processor 210 can provide instructions to the controller 204 based on feedback and other information received from the controller 204. The mirror controller 204 can also provide START signals to the light emitter (as shown in FIG. 1).

Embodiment 1

Figure 3B:
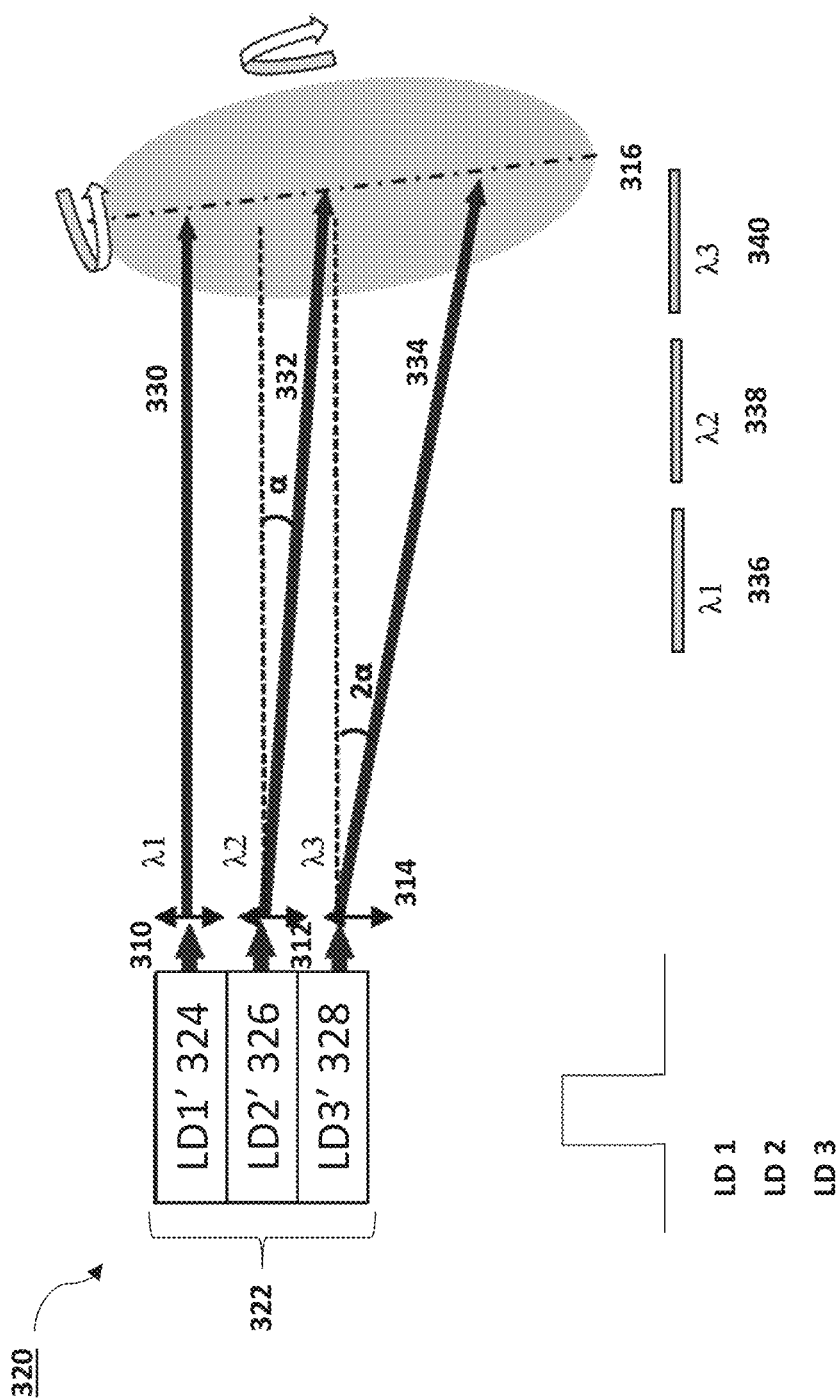
FIG. 3B is a schematic diagram of an example laser diode stack having different wavelength emitters and a 2D scanning mirror in accordance with embodiments of the present disclosure.
Figure 3C:
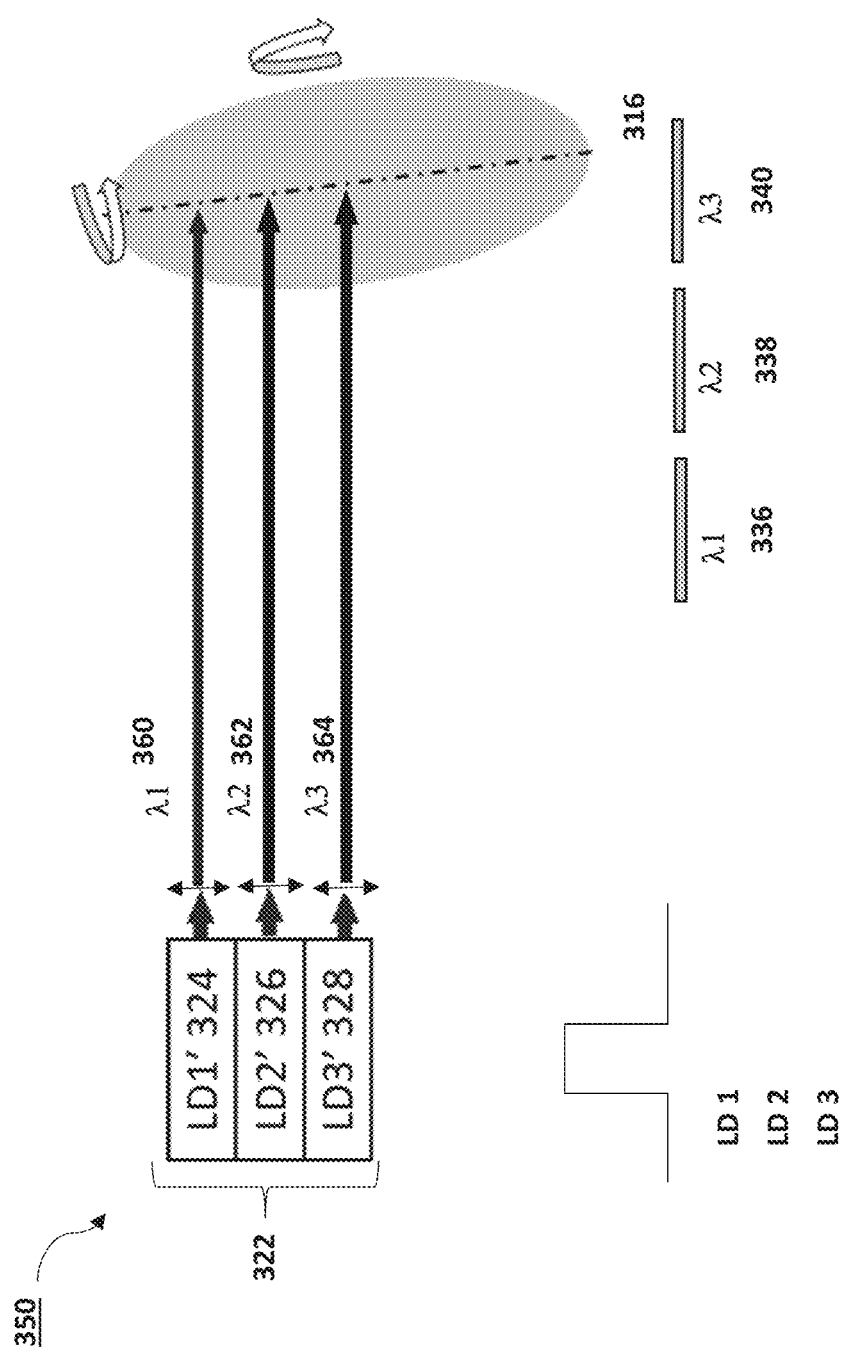
FIG. 3C is a schematic diagram of another example laser diode stack having different wavelength emitters and a 2D scanning mirror in accordance with embodiments of the present disclosure.

FIG. 3A is a schematic diagram of an imaging subsystem 300 that includes a laser diode stack and a 2D steering device in accordance with embodiments of the present disclosure. Imaging subsystem 300 includes a laser diode stack 302 that includes three laser diodes: LD1 304, LD2 306, and LD3 308. In the example in FIG. 3A, each laser diode 304-308 in the laser stack 302 emits light having the same wavelength. The example shown in FIGS. 3A-3C show three light emitters as an example; however, it is understood that more than 3 light emitters can be used in embodiments of this disclosure.

Imaging subsystem 300 can be part of a 3D remote sensing system with multiple emitters and 2D light steering device 316. Each of the multiple laser diodes 304-308 can be driven simultaneously or at different times. Beams from each of the multiple laser diodes 304-308 can be collimated by dedicated lenses 310-314, respectively, which also deflect light towards the light steering device. For example, light emitted from LD1 304 can be collimated by dedicated lens 310, light emitted from LD2 306 can be collimated by dedicated lens 312, light emitted from LD3 308 can be collimated by dedicated lens 314. The emitters 304-308 can be placed, in respect to each other, at a different angle or have the respective lens to collimate and deflect the beam at an angle. The deflection angle is $\alpha$. If more than two emitters are used, then the deflection angle for beam 311 from LD1 304 will be 0 degrees, the deflection angle for beam 313 from LD2 306 will be $\alpha$, the deflection angle for beam 315 from LD1 308 will be $2*\alpha$, and so on. The emitters can also be placed in an array configuration for example 2×2 so that the elements in a row will increase the FOV in the X direction while the elements in a column will increase the FOV in the Y direction. With such a configuration the deflecting angle, in one direction, of the light steering device is augmented by $N_{Emitted}*\alpha$. In this example (with 3 laser diodes), the 2D light steering device 316 only requires to move the angle of $\alpha$ to achieve the total angular range of $3*\alpha$. So, for each line, the number of scanning points is 3 times less.

In embodiments, a scene can be considered to include regions. Each region can include corresponding columns of pixels (or pixel locations). The size of each region can be determined based, at least in part, on the angle $\alpha$, and the number of regions can be based, at least in part on the angle $\alpha$ and the number of light emitters. The first column of each region can be scanned, followed by the second column of each region, etc. An advantage to this approach is that the actual motion of the scanning mirror is ⅓ of the field of view (FOV), which can speed up the scanning process. The size of the scanning mirror can also be adjusted based on a trade-off between a desired FOV and a desired scanning speed.

In this example, the light emitter controller can drive each laser diode 304-308 to emit light sequentially at an interval of T (here, T=20 ns).

The laser stack 302 is shown to include 3 laser diodes. But it is understood that more laser diodes can be used. Also, multiple stacks can be used, for example, two 3 laser diodes stacks.

FIG. 3B is a schematic diagram of an example laser diode stack having different wavelength emitters and a 2D light steering device 316 in accordance with embodiments of the present disclosure. Imaging subsystem 320 includes a laser diode stack 322 that includes three laser diodes: LD1' 324, LD2' 326, and LD3' 328. In the example in FIG. 3B, each laser diode 304-308 in laser stack 302 emits light having a different wavelength: LD1' 324 emits a beam 330 having a wavelength $\lambda 1$; LD2' 326 emits a beam 332 having a wavelength $\lambda 2$, LD3' 328 emits a beam 334 having a wavelength $\lambda 3$. The imaging subsystem 320 includes a photosensitive element that can distinguish wavelengths $\lambda 1$, $\lambda 2$, $\lambda 3$. In this example, the light emitters 324, 326, and 328 can be activated at the same time because the resulting reflected light received back from the object will correspond to different wavelengths. In some embodiments, the photosensitive elements 336, 338, and 340 can differentiate wavelengths of light. For example, the photosensitive elements 336, 338, and 340 can be part of a mosaic style sensor element or can include a stacked color sensitive element. In embodiments, different photosensitive elements can be used for each wavelength of light emitted. The imaging subsystem 320 includes dedicated lenses 310, 312, and 314 that can deflect the beams 330, 332, 334 of emitters 324, 326, and 328, respectively, as described above with FIG. 3A.

FIG. 3C is a schematic diagram of another example laser diode stack having different wavelength emitters and a 2D light steering device in accordance with embodiments of the present disclosure. In FIG. 3C, the emitters 324-328 are similar to those described above for FIG. 3B. But in FIG. 3C, no deflector lenses are used, and the beams 360, 362, and 364 are not deflected.

Increasing the number of emitters can increase the number of points that can be measured at one specific position of the light steering device and will increase the speed measurement for each point since there is no waiting time needed for the light steering device to move in the next position, in the case of using the same wavelength for all emitters the light emitter pulse duration and max distance to be measured will limit the improvements provided by this solution. As an example, assuming that the light steering device moves from point to point in 100 ns and the emitter pulse is 5 ns; then using three emitters, each light emitter can emit three light pulses 25 ns apart within a light steering position. Consequently, the maximum detectable distance to 3.74 m (considering that light travels two ways) is limited by the 25 ns pause between pulses.

In some embodiments, more than one laser diode stacks can be used. For example, configurations can be dictated by resolution and speed requirements. A 2×2 stack (e.g., 2 stacks of 2 laser diodes) can reduce requirements for VGA/ 30 fps down to ¼ VGA.

Embodiment 2

In some embodiments, a collimation lens can be used instead of a light steering device to deflect the laser beam in one direction. The lens in this system plays two roles: collimation and deflection. The principle is the propagation direction will be bent when the light source is not on the optical axis of the lens. Since only one direction scanning is required for the light steering device, the speed requirement and design complexity are much reduced. Therefore, the light steering device driver system is not so critical.

Figure 4A:
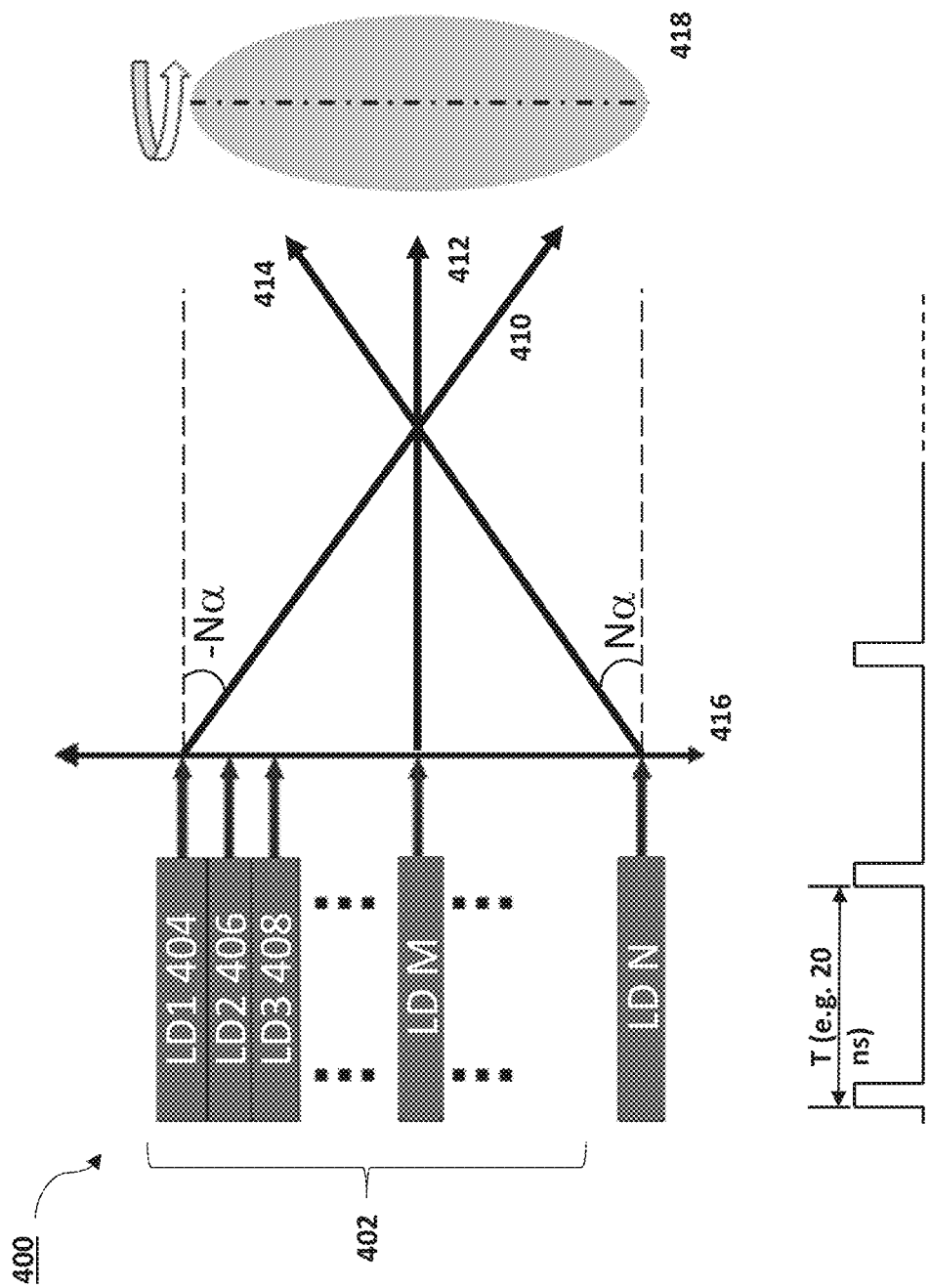
FIG. 4A is a schematic diagram of a laser diode stack with 1D scanning mirror in accordance with embodiments of the present disclosure.

FIG. 4A is a schematic diagram of an imaging subsystem 400 that includes a 1D laser diode array 402 and a collimation lens 412 in accordance with embodiments of the present disclosure. The imaging subsystem 400 includes a 1D laser diode array 402. The number of laser diodes (LD) in the LD array 402 would match the desired number of pixels on the short axis of the image, such as 240 in the case of QVGA application. The LD array 402 can include laser diodes LD1 404, LD2 406, LD3 408, LDM . . . LDN, where N is total number of laser diodes in a stack 402 and M is an LD that is in the middle or near the middle of the stack 402. The LD array 402 can be placed on the focal point of the collimation lens 416 and the center of the LD array 402 is coincident with the optical axis of the collimation lens 416.

Laser beams emitted from the LD array 402 can be collimated by the collimation lens 416. The beam emitted from the off centered laser diode unit in the array will be deflected. The further it is away from the center, which is the optical axis, the larger the deflection angle would be. For example, beam 410 is emitted from LD1 404 and is deflected by an angle N$\alpha$ by the collimation lens 416. Similarly, beam 414 is emitted from LDN and is deflected by collimation lens 416 by an angle N$\alpha$. Beam 412 emitted from LDM that is close to the center of the collimation lens 416 deflects by a small or no angle, depending on the position of LDM.

All beams would be incident on a 1D light steering device 418 and reflected out to the free space for detection. The light steering device 418 is designed to have a sufficient size to completely cover the beam from each element. The light steering device 418 will not change position until the sequential pulsed operation of the laser diode array finishes, which can take 24 s assuming an interval of 100 ns for 240 pixel vertical resolution.

One direction of the FOV is determined by the 1D light steering device 414, while the other direction is determined by the collimation lens 416 and the laser diode array 402.

The light reflected back from each pixel is received by a photodetector such as photodiode, APD, SPAD, etc., as described in FIG. 1. The received light can be amplified by a trans-impedance amplifier. The TOF can be calculated and then provide the distance information of each pixel in the frame.

In embodiments, each laser diode in a stack can include LDs that emit light at different wavelengths. Each LD can emit a unique wavelength of light. However, for an LD stack or array, wavelengths can be repeated. For example, a first subset of the LDs can emit light at a first wavelength, a second subset of LDs can emit light at a second wavelength, etc. The LDs adjacent to one another can emit a unique wavelength of light, and, depending on the total number of emitters, some wavelengths may be repeated for the entire LD stack or across the LD array (if multiple stacks are used).

Figure 4B:
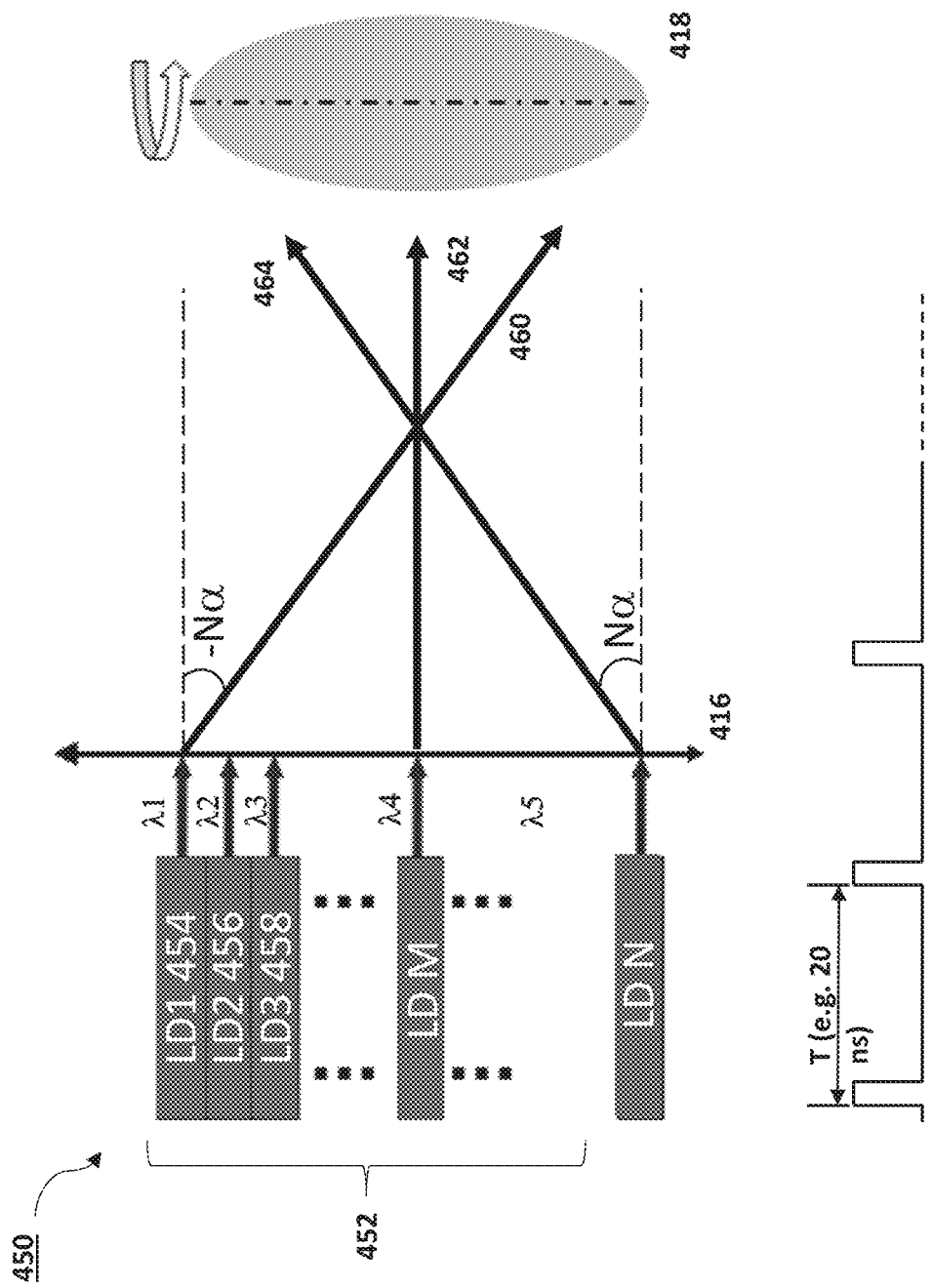
FIG. 4B is a schematic diagram of a laser diode stack having a plurality of laser diodes each having a unique emission wavelength with 1D scanning mirror in accordance with embodiments of the present disclosure.

FIG. 4B is a schematic diagram of an imaging subsystem 450 that includes a 1D laser diode array 452 and a collimation lens 416 in accordance with embodiments of the present disclosure. The laser diode array 452 can include laser diodes each configured to emit a unique wavelength of light. For example, LD1 454 can emit light at wavelength $\lambda 1$. For example, LD2 456 can emit light at wavelength $\lambda 2$. For example, LD3 458 can emit light at wavelength $\lambda 3$. LD1 454 can emit a light beam 460 that is refracted at angle Nα by lens 416. Similarly, LDM can emit a light beam 462 that propagates through the middle or near the middle of lens 416. LDN can emit a light beam 464 that is refracted at an angle Nα.

Embodiment 3

Figure 5:
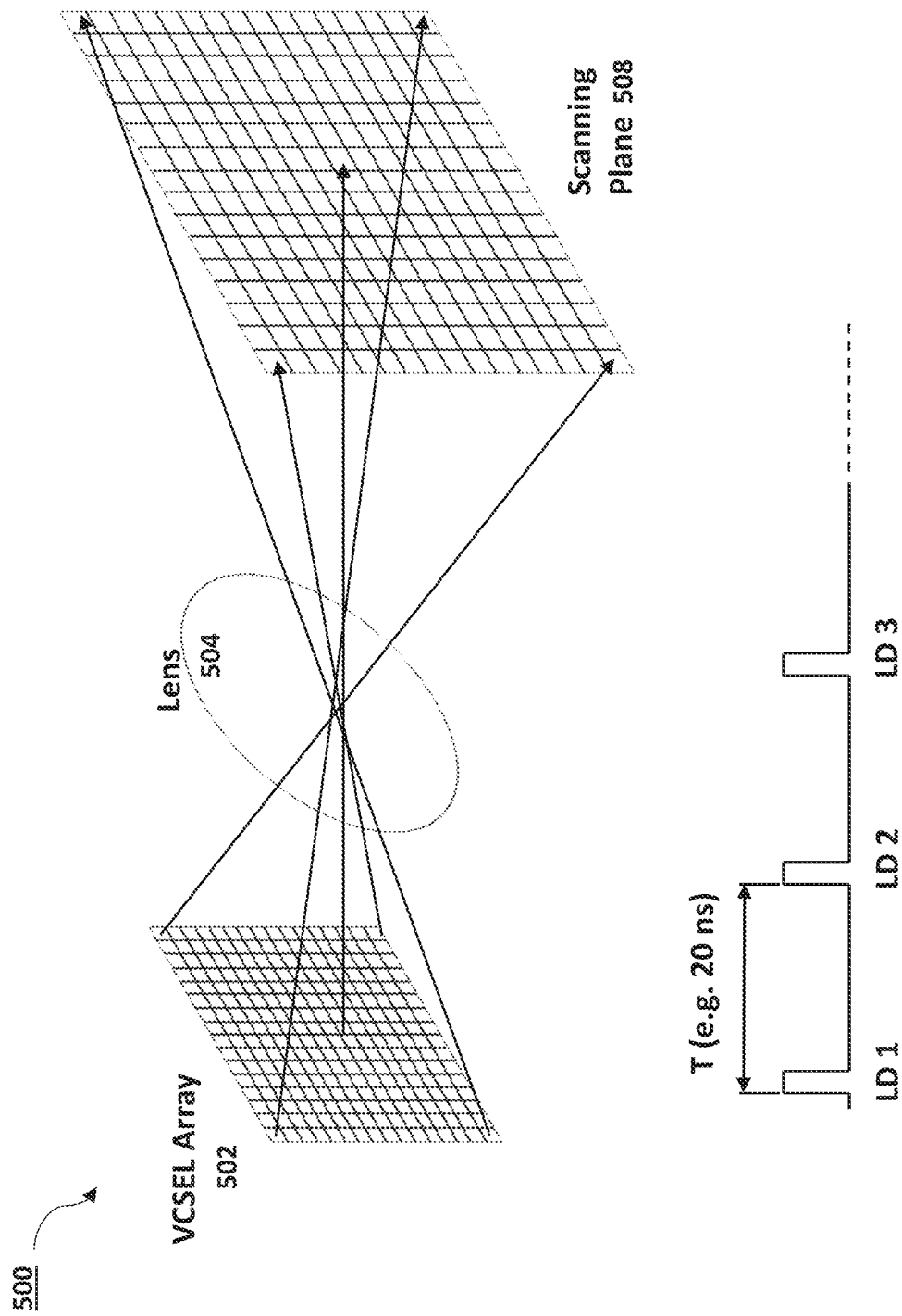
FIG. 5 is a schematic diagram of a laser array with a lens in accordance with embodiments of the present disclosure.

Some embodiments include a 3D sensing system with 2D laser diode array and without a light steering device. FIG. 5 is a schematic diagram of an imaging system 500 that includes a laser array with a lens in accordance with embodiments of the present disclosure. In embodiments, a collimation lens 504 can be used instead of the light steering device to deflect the laser beam on orthogonal directions. The collimation lens 504 in this system 500 plays two roles: collimation and deflection. The propagation direction will change when the light source is not on the optical axis of the lens.

System 500 includes a 2D laser diode array 502 (e.g. large VCSEL array). The number of laser diode units in the 2D laser diode array 502 can be selected to match the desired resolution of the image, such as 320*240 in the case of QVGA. The laser diode array 502 is placed on the focal point of the collimation lens 504 and the center of the array is coincident with the optical axis of the collimation lens. The laser diode array 502 can include laser diodes having the same emission wavelength. In embodiments, the laser diode array 502 can include laser diodes each having a different wavelength.

Laser beams emitted from the array will be collimated by the collimation lens. The beam emitted off from the centered laser diode unit in the array will be deflected. The further it is away from the center, which is the optical axis, the larger the deflection angle will be. Therefore, the laser beam from different elements would have different propagation directions.

The field of view (FOV) is determined and can be adjusted by the focal length of the collimation lens and the size of the 2D laser diode array.

The light reflected back from each pixel (subset in the scene) is received by a photodetector such as photodiode, APD, SPAD, etc. as described in FIG. 1, and amplified by trans-impedance amplifier. The TOF can be calculated and then provide the distance information of each pixel in the frame.

Since each laser diode unit in this system would only operate one time per frame, each laser diode can be driven at very high peak current without being worried about the thermal damage. And because there are no beam deflection system or moving parts, this system could be more compact, robust, and stable.

Drivers

When driving multiple LDs in Pulsed ToF applications, there are several issues to be considered such as differences in propagation delays, minimizing driving paths and high instantaneous current delivery with rising and falling times of less than 1 ns. A dedicated driver can be used to address issues that can arise in a multi LDs system.

Figure 6:
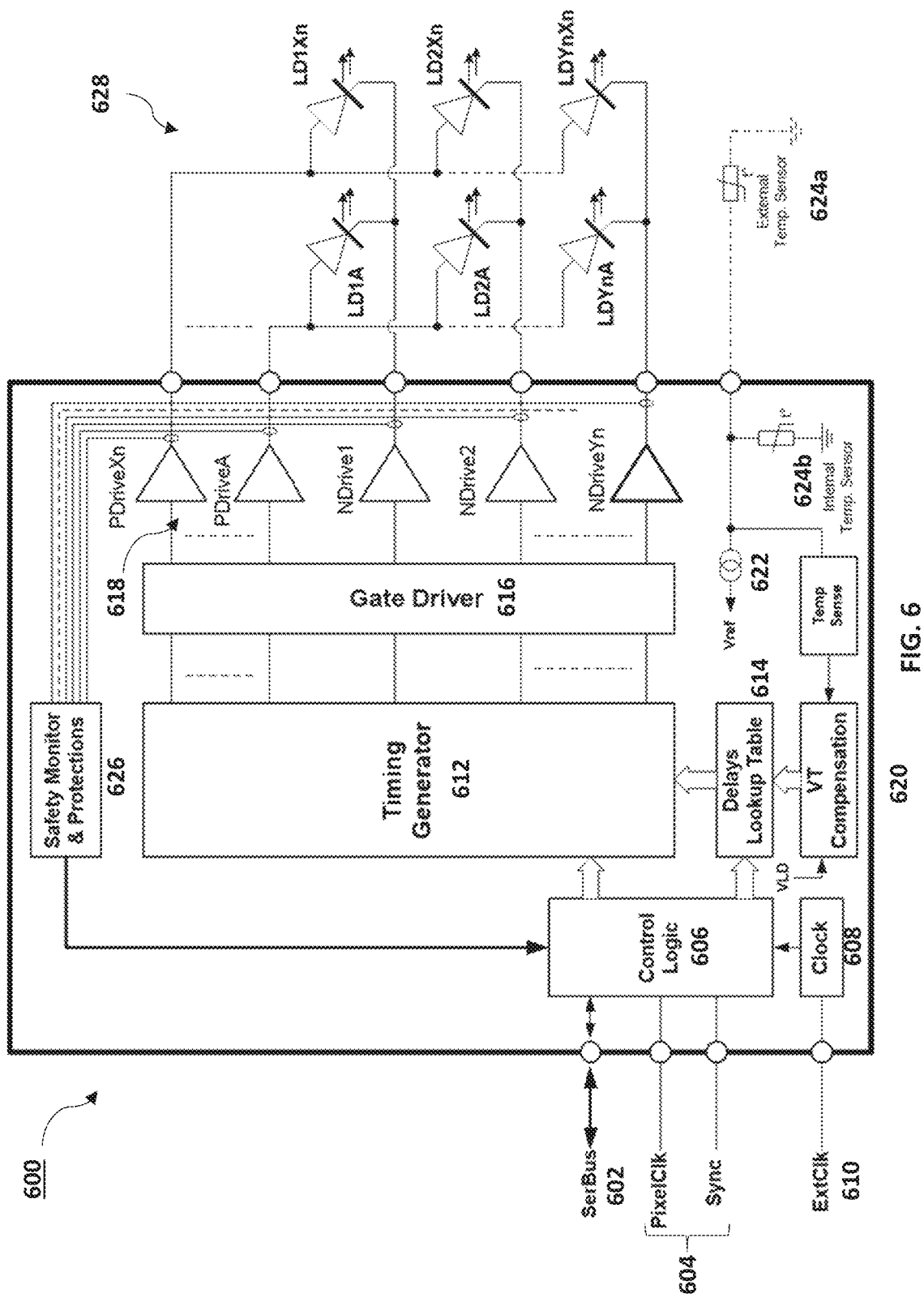
FIG. 6 is a schematic diagram of an example driver circuit 600 in accordance with embodiments of the present disclosure.

FIG. 6 is a schematic diagram of an example driver circuit 600 in accordance with embodiments of the present disclosure. Driver must have a programmable tuning delay control to offset timing variations from driver to driver. Ideally the driver should have a complete timing generator to drive all the lasers at the required timing plus offset.

The laser driver 600 can be used to control the laser pulse duration and operation timing. The driver includes a complete timing generator to drive all the lasers at the required timing plus offset. Each element of the laser diode array will operate at pulsed mode (e.g. 2 ns) sequentially from one side to the other side with time interval dictated by the required resolution and frame rate. The scanning line addressing the short axis (e.g. the Vertical Resolution) of the frame can be created.

In embodiments, each element of laser diode array will operate at pulsed mode (e.g. 2 ns) sequentially and line by line, from the 1st pixel to the last pixel with time interval dictated by the required horizontal resolution and frame rate. A 2D scanning pattern can be generated in the free space corresponding to the elements on the 2D laser diode array.

Even in case of a highly optimized driver/LDs package there will still be difference between driven LDs, the driver must be capable of compensating delays due to path differences as well as temperature, aging and supply voltage variations. It can be useful to have programmable delays, for each driver to LD path, which might be stored in a lookup table. This table can be stored during factory calibration and/or uploaded by an application processor during runtime.

For LDs configuration above 2×2 it is preferable to drive the Laser Diode as dot matrix to minimize the number of power switches and silicon real estate since that only one LD will be driven at the time. The driver can also be designed to drive more than one LD at the time for example in case of LDs with different wavelengths are used.

Driver circuit 600 can be electrically connected to a plurality of LDs 628.

Driver circuit 600 includes a processor interface, such as a serial bus 602. Serial bus 602 can include an I2C or SPI used to configure the driver (e.g. LDs matrix configuration, pulse width ($t_{PW}$), Delay Table) and check statuses and fault conditions.

Dedicated digital lines 604 (Sync and PixelClk) can be used to synchronize the driver with the light steering device operation. The Sync input informs the driver that a new frame and/or a new line is being generated, PixelClk input informs the driver when the next pixel is occurring, the driver will internally generate the activation pulses for the LDs matrix configuration. Additional digital I/Os, such as Reset, Chip Enable, Interrupt may also be used according to the system implementation.

The driver circuit 600 can include control logic 606. Control logic 606 can include a state machine controlling the operation of the driver and detecting fault conditions.

The driver circuit 600 can use internal or external high-speed clock 608 to generate an internal time-base for all the timing operations such as delays and pulse width. If high accuracy is required an external clock, from a stable oscillator, can be used through the external clock input 610.

The driver circuit 600 can include a timing generator 612. Timing generator 612 fetches delay timings from a delay lookup table 614 in accordance with the LD scan matrix in use. The timing generator 612 can also time the duration of the activation pulse width timing $t_{PW}$ and other required timings. The delay table 614 contains the delays used for each LD driving event. The delay table 614 can be loaded by an external processor or preprogrammed after factory calibration. The individual delay table 614 is compensated for LDs path mismatch and other environmental variables such temperature and supply voltage.

The driver circuit 600 also includes a gate driver 616. The gate driver 616 interfaces the digital activation signals from the timing generator 612 to the LDs Power Drivers 618.

The driver circuit 600 can include a voltage/temperature (VT) Compensation element 620. The VT compensation element 620 can be a hardware and/or software element to compensate LD Activation delays for temperature, aging and voltage variations. The VT compensation element 620 can use information from a reference voltage 622 and from external temperature sensor 624a and/or internal temperature sensor 624b.

In embodiments, the driver circuit 600 can include safety monitor and protections circuit element 626. The safety monitor and protections element 626 can check open and short-circuits, LD Failures, over-voltages, etc., and can instruct the control logic block to turn off the activation in case of faults.

Figure 7:
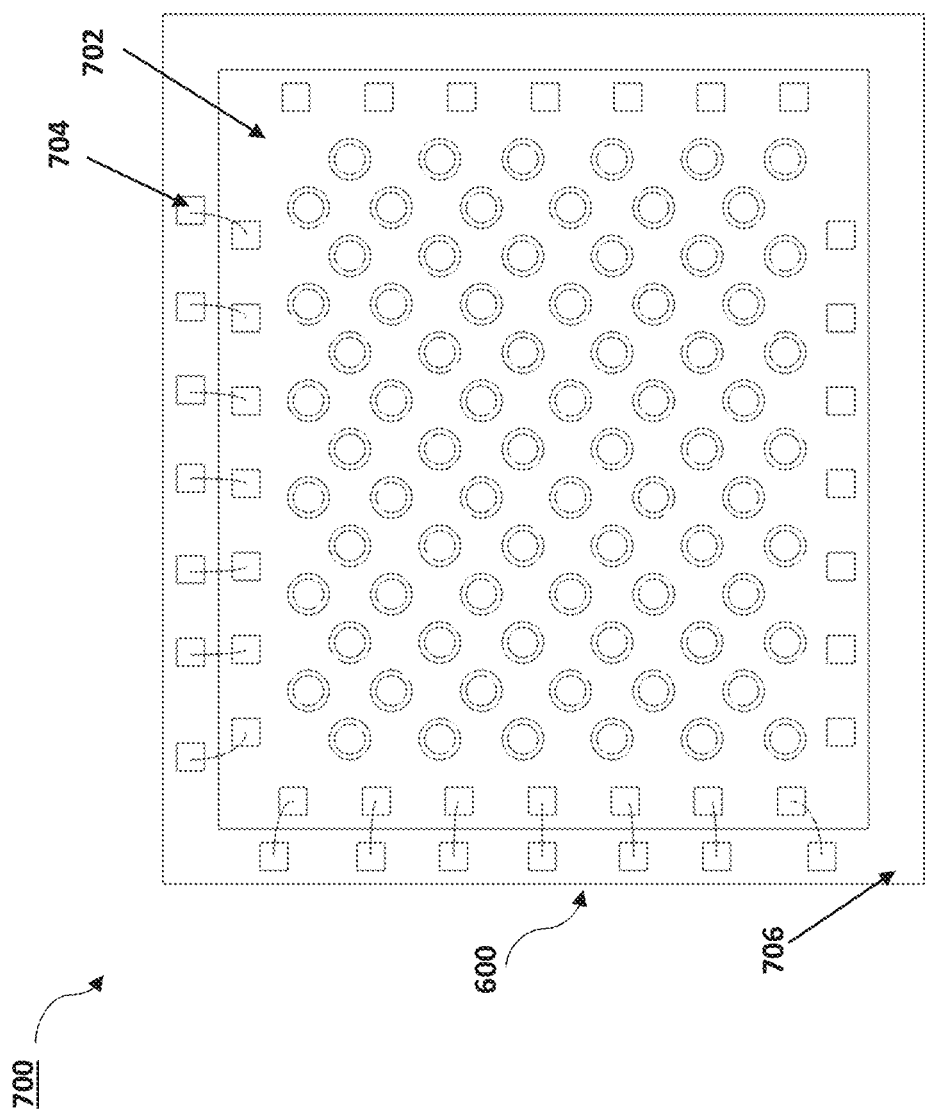
FIG. 7 is a schematic diagram of an example driver integrated into a laser diode array in accordance with embodiments of the present disclosure.

FIG. 7 is a schematic diagram of an example driver 600 integrated into a laser diode array 702 in accordance with embodiments of the present disclosure. An important aspect when driving multiple LDs is the proximity between LDs 702 and the driver 600. Even a small length trace can introduce a significant parasitic inductance that slows down the current rising and falling edges. Combining the LDs 702 and driver 600 as single device can reduce electrical issues. The integrated system 700 can include interconnections that are minimized as much as possible with direct bonding and strategic placement of interconnect pads 704. Stacking driver die 706 and LDs 702, where possible, can also help to minimize the connection length. The driver die 706 can include the driver circuit 600, shown in FIG. 6.

Figure 8:
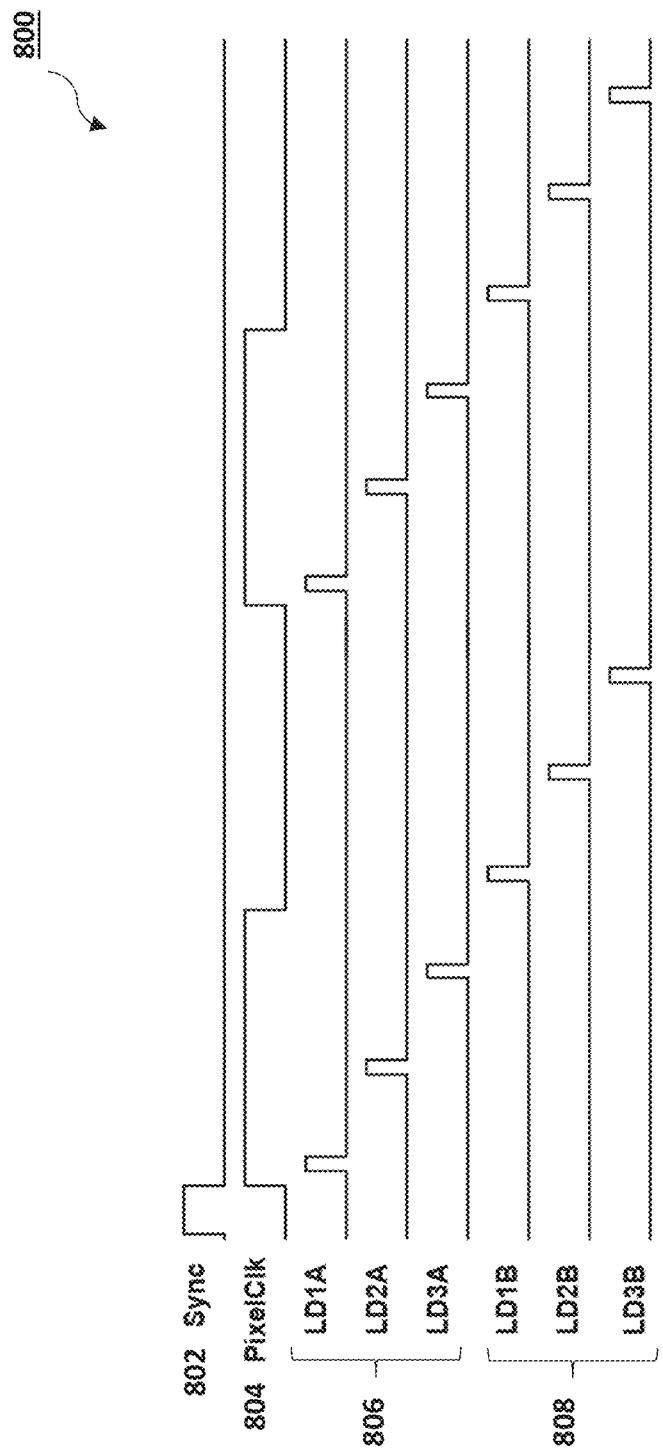
FIG. 8 is a timing diagram for the timing for driving a 2×3 LD configuration in accordance with embodiments of the present disclosure.

FIG. 8 is a timing diagram 800 for the timing for driving a 2×3 LD configuration. The driver synchronizes the activation upon receiving a rising edge on the Sync pin 802. This synch signal could indicate the start of a new frame or a new line to be scanned. A rising edge on PixelClk 804 triggers the driver to generate a series of pulses (six in this example) with $t_{PW}$ duration according with a delay ($t_{DLYnn}$) value fetched in the Delay Lookup Table. The driver can then provide sequential driving pulses to a first LD array 806, which includes LD1A, LD2A, and LD3A, and sequential driving pulses to the second LD array 808, which includes LD1B, LD2B, and LD3B.

Figure 9:
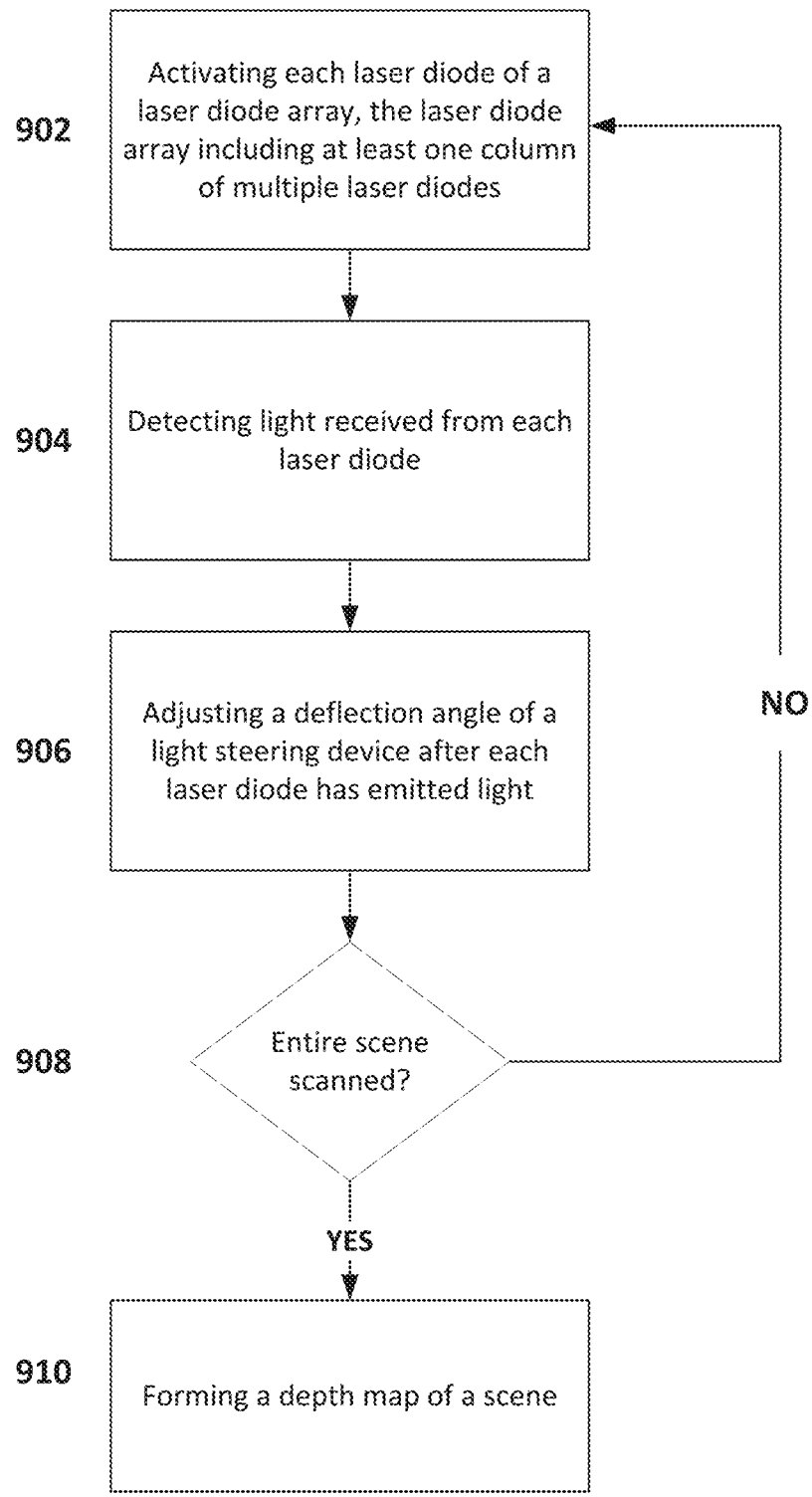
FIG. 9 is a process flow diagram for operating a time-of-flight imaging system in accordance with embodiments of the present disclosure.

FIG. 9 is a process flow diagram 900 for operating a time-of-flight imaging system in accordance with embodiments of the present disclosure. Each laser diode of a laser diode array of the time-of-flight imaging system can be activated sequentially (902). The laser diode array can include at least one column of multiple laser diodes. After each laser diode is emitted, a light steering device can be adjusted to scan the next points or regions of the scene (904). In addition, after the light is emitted from each laser diode, the reflected light from the scene can be received by a photodetector at the light imaging device (906). Though steps (904) and (906) are discussed and shown sequentially, these events can occur in a different order or can occur at the same time. For example, prior to emitting the last laser diode, the photodetector can receive light originating from the first laser diode. The order of operations is not meant to be implied by the order of the steps shown in the process flow diagram 900.

It can be determined whether the entire scene has been scanned (908). If the entire image has not been scanned, the laser diodes can continue being driven (902), and the steering device can steer emitted light to scan the entire scene (904) based on captured reflected light (906). If the entire scene has been scanned, then a depth map can be created using the received light (910). In some embodiments, the depth map can be created after the light is received from the scene without waiting for the entire scene to be scanned.

What is claimed is:

1. A time-of-flight imaging system for augmenting field of view while decreasing scan time, the time-of-flight imaging system comprising:
   a one-dimensional array of n light emitters;
   a one-dimensional array of n collimating lenses, each collimating lens is disposed in a light emitting pathway of each light emitter and configured to:
      substantially collimate the light passed therethrough; and,
      direct the collimated light at an angle, α, relative to one or more adjacent beams formed by the one-dimensional array of n collimating lenses;
      wherein, the angle, α, is non-zero and measured in the plane of the one-dimensional arrays and substantially orthogonal to the respective light emitting pathways;
   a scanning mirror configured to dynamically steer a collimated beam array formed from the one-dimensional array of n collimating lenses towards an object; and,
   a photosensitive element for receiving reflected light from an object.

2. The time-of-flight imaging system of claim 1, wherein each member of the one-dimensional array of n light emitters is a laser diode.

3. The time-of-flight imaging system of claim 1, wherein the one-dimensional array of n light emitters comprises stacked laser diodes.

4. The time-of-flight imaging system of claim 1, wherein a steering beam of the scanning mirror is one-dimensional.

5. The time-of-flight imaging system of claim 1, wherein a steering beam of the scanning mirror is two-dimensional.

6. The time-of-flight imaging system of claim 1, wherein the one-dimensional array of n light emitters emits a plurality of colors.

7. The time-of-flight imaging system of claim 2, wherein each of the laser diodes of the one-dimensional array of n light emitters emits light at a unique wavelength.

8. The time-of-flight imaging system of claim 1, further comprising a collimating lens disposed in the reflected light path from the object to the photosensitive element.

9. The time-of-flight imaging system of claim 1, wherein the one-dimensional array of n light emitters comprises vertical-external-cavity surface-emitting-lasers (VECSEL).

10. The time-of-flight imaging system of claim 1, wherein the one-dimensional array of n light emitters comprises a vertical cavity surface emitting lasers (VCSEL).

11. The time-of-flight imaging system of claim 1, further comprising a light emitter driver configured to drive the light emitters to emit pulses of light at predetermined intervals.

12. The time-of-flight imaging system of claim 11, wherein the light emitter driver is configured to drive each light emitter of the one-dimensional array of light emitter sequentially at predetermined intervals.

13. The time-of-flight imaging system of claim 7, further comprising a light emitter driver configured to drive the light emitters to emit pulses of light at predetermined intervals wherein the light emitter driver is configured to drive each light emitter of the one-dimensional array of light emitters substantially simultaneously.

14. The time-of-flight imaging system of claim 1, further comprising an image processor configured to receive image information from the photosensitive element to determine a distance from the imaging system to the object.

15. The time-of-flight imaging system of claim 1, wherein the photosensitive element comprises one of a photodiodes, an avalanche photodiode (APD), single photon avalanche diode (SPAD), or a charge coupled device (CCD).

16. A time-of-flight imaging method for augmenting field of view while decreasing scan time, the time-of-flight imaging method comprising:
driving a one-dimensional array of n laser diodes to emit an array of pulses of light;
collimating a one-dimensional array of light pulses using a one-dimensional array of n collimating lenses;
disposing each of the collimating lenses in the array of n collimating lenses in a light pathway of each light pulse, whereby each collimating lens is configured to:
substantially collimate the light passed therethrough; and,
direct the collimated light at an angle, $\alpha$, relative to one or more adjacent beams formed by the one-dimensional array of n collimating lenses;
wherein, the angle, $\alpha$, is non-zero and measured in the plane of the one-dimensional arrays and substantially orthogonal to the respective light emitting pathways;
dynamically steering a collimated beam array formed from the one-dimensional array of n collimating lenses using a scanning mirror; and,
detecting reflected light.

17. The time-of-flight imaging method of claim 16, further comprising adjusting a deflection of a scanning mirror after each laser diode of the one-dimensional array of n laser diodes has emitted the pulse of light.

18. The time-of-flight imaging method of claim 17, whereby adjusting the deflection of the scanning mirror comprises rotating the light steering device after each laser diode has emitted a pulse of light in a single axis.

19. The time-of-flight imaging method of claim 17, whereby adjusting the deflection of the scanning mirror comprises rotating the light steering device after each laser diode has emitted a pulse of light in two degrees of freedom.

20. The time-of-flight imaging method of claim 16, further comprising determining a depth of an object based on a reflection of the emitted pulses of light received from the object.

21. A time-of-flight imaging apparatus for augmenting field of view while decreasing scan time, the time-of-flight imaging apparatus comprising:
means for driving a one-dimensional array of n laser diodes to emit an array of pulses of light;
means for collimating a one-dimensional array of light pulses using a one-dimensional array of n collimating lenses;
means for disposing each of the collimating lenses in the array of n collimating lenses in a light pathway of each light pulse, whereby each collimating lens is configured to:
substantially collimate the light passed therethrough; and,
direct the collimated light at an angle, $\alpha$, relative to one or more adjacent beams formed by the one-dimensional array of n collimating lenses;
wherein, the angle, $\alpha$, is non-zero and measured in the plane of the one-dimensional arrays and substantially orthogonal to the respective light emitting pathways;
means for dynamically steering a collimated beam array formed from the one-dimensional array of n collimating lenses using a scanning mirror; and,
means for detecting reflected light.

* * * * *